United States Patent
Nazarov et al.

(10) Patent No.: US 11,854,101 B1
(45) Date of Patent: Dec. 26, 2023

(54) SYSTEMS, METHODS, AND STORAGE MEDIA FOR INTERFACING AT LEAST ONE SMART CONTACT STORED ON A DECENTRALIZED ARCHITECTURE WITH EXTERNAL DATA SOURCES

(71) Applicant: SmartContract Chainlink Limited SEZC, Grand Cayman (KY)

(72) Inventors: Sergey Nazarov, New York, NY (US); Steve Ellis, San Francisco, CA (US); Ari Juels, New York, NY (US)

(73) Assignee: SmartContract Chainlink Limited SEZC, Grand Cayman (KY)

(*) Notice: Subject to any disclaimer, the term of this patent is extended or adjusted under 35 U.S.C. 154(b) by 806 days.

(21) Appl. No.: 16/553,292

(22) Filed: Aug. 28, 2019

Related U.S. Application Data

(60) Provisional application No. 62/724,309, filed on Aug. 29, 2018.

(51) Int. Cl.
*G06Q 50/18* (2012.01)
*G06F 9/54* (2006.01)

(52) U.S. Cl.
CPC ............. *G06Q 50/18* (2013.01); *G06F 9/547* (2013.01)

(58) Field of Classification Search
CPC ..................................................... G06Q 50/18
See application file for complete search history.

(56) References Cited

U.S. PATENT DOCUMENTS

| | | | | |
|---|---|---|---|---|
| 2004/0082319 A1* | 4/2004 | Shaw | ................ | H04M 15/8044 455/414.1 |
| 2009/0299868 A1* | 12/2009 | O'Leary | ............ | G06Q 30/0601 705/26.1 |
| 2018/0285979 A1* | 10/2018 | Chessell | ................ | G06Q 40/08 |
| 2020/0104958 A1* | 4/2020 | Cheng-Shorland | ........... | G06Q 10/101 |

FOREIGN PATENT DOCUMENTS

WO  WO-2019049042 A1 *  3/2019  ......... H04L 43/0817

OTHER PUBLICATIONS

M. Wöhrer and U. Zdun, "Design Patterns for Smart Contracts in the Ethereum Ecosystem," 2018 IEEE International Conference on Internet of Things (iThings) and IEEE Green Computing and Communications (GreenCom) and IEEE Cyber, Physical and Social Computing (CPSCom) and IEEE Smart Data (SmartData) (2018).*

\* cited by examiner

Primary Examiner — Julie M Shanker
(74) Attorney, Agent, or Firm — Rimon PC; Marc S. Kaufman

(57) ABSTRACT

Systems, methods, and storage media for interfacing at least one smart contact stored on a decentralized architecture with external data sources are disclosed. Exemplary implementations may: receive service level information from a user; publish, by an on-chain order-matching contract, a log representing the required attributes; receive, by the on-chain order-matching contract, bids from plural external data sources based on the log of the required reputation attributes; and select, by the on-chain order-matching contract, more than one of the plural external data sources as selected data sources and notifying the selected data sources, whereby the selected data sources can be used collectively to provide information requested by the at least one smart contract.

30 Claims, 4 Drawing Sheets

SYSTEMS, METHODS, AND STORAGE MEDIA FOR INTERFACING AT LEAST ONE SMART CONTACT STORED ON A DECENTRALIZED ARCHITECTURE WITH EXTERNAL DATA SOURCES

CROSS-REFERENCE TO RELATED APPLICATIONS

The present application claims benefit of the filing date of provisional application Ser. No. 62/724,309 filed on Aug. 29, 2018, the entire disclosure of which is incorporated herein by reference.

FIELD OF THE DISCLOSURE

The present disclosure relates to systems, methods, and storage media for interfacing at least one smart contact executing on a decentralized computing infrastructure with external data sources.

BACKGROUND

"Smart contracts" are executable computer code that is stored on a decentralized infrastructure, such as a blockchain or other decentralized architecture infrastructure. Decentralized infrastructures are effectively immutable. In other words, information stored on a decentralized infrastructure, such as a blockchain, cannot be changed. A "consensus" mechanism is utilized to ensure that new data added to the ledger of the decentralized infrastructure is accepted as accurate by the community of users. It follows that smart contracts are tamperproof, in the sense that no party (even their creator) can alter their code or interfere with their execution once they have been stored on the decentralized infrastructure.

Historically, contracts embodied in code have run in a centralized manner that leaves them subject to alteration, termination, and even deletion, by a privileged party. In contrast, the execution of a smart contract is guaranteed, thereby effectively binding all parties to an agreement as expressed in the code. For example, a simple smart contract may express an agreement that any value in cryptocurrency sent to a designated wallet address on the decentralized infrastructure will be invested in a specific manner. Smart contracts can create new and powerful types of relationships that do not rely on trust in any one central party (such as a bank or a government). Because they are tamperproof, smart contracts can offer a superior vehicle for realizing and administering digital agreements.

However, the powerful new trust model embodied by smart contracts introduces a new technical challenge: connectivity. Many pragmatic smart contract applications rely on data about the real world that comes from off-chain resources, i.e. resources that are not executed and/or stored on the same decentralized architecture. For example, these data sources can be data feeds and APIs, that are external to the decentralized architecture. Because of the mechanics of the consensus mechanisms underpinning decentralized architectures, the architecture cannot directly fetch such critical data. When data is fetched from an external resource, it cannot be easily verified and thus could affect the reliability of a smart contract that depends on the data for execution.

In order for smart contracts to successfully replace more conventional contractual mechanisms, a high-assurance of versions of the same types of data inputs and outputs will be required. Examples of potential next-generation smart contracts and their data requirements include:

Insurance smart contracts which will need data feeds about IoT data related to the insurable event in question, e.g., data indicating whether the warehouse magnetic door was locked at the time of breach, data indicating whether the company's firewall was online, or data indicating whether an insured flight arrive on time.

Trade finance smart contracts will need GPS data about shipments, data from supply chain ERP systems, and customs data about the goods being shipped in order to confirm fulfillment of contractual obligations.

Another problem common to these examples is the inability for smart contracts to output data into off-chain systems. Such output often takes the form of a payment message routed to traditional centralized infrastructure in which users already have accounts, e.g., for bank payments, PayPal, and other payment networks.

It is axiomatic that the source of such off-chain data, often referred to as "oracles" must be secure. For example, if a smart contract for a security gets a false data feed, it may pay out an incorrect amount and/or make the payment to the incorrect party. if smart contract insurance data feeds can be tampered with by the insured party, the result may be insurance fraud. More generally, a well-functioning decentralized infrastructure with its ledger abstraction, offers very strong security properties. Users rely on decentralized infrastructures, such as blockchains, to correctly validate transactions and prevent data from being altered. A supporting oracle service must offer a level of security commensurate with that of the blockchain it supports. An oracle must therefore serve users as an effective trusted third party, providing correct and timely responses with very high probability. The security of any system is only as strong as its weakest link. Therefore, a highly trustworthy oracle is required to preserve the trustworthiness of a well-engineered blockchain.

An instructive, principled way to reason about oracle security stems from the following thought experiment. Imagine that a trusted third party (TTP)—an ideal entity or functionality that always carries out instructions faithfully to the letter—were tasked with running an oracle. Such an oracle is denoted by "ORACLE" herein (using all caps in general to denote an entity fully trusted by users), and suppose that the TTP obtains data from a perfectly trustworthy data source.

To achieve the property of oracle integrity, sometimes also referred to as "authenticity," we would simply ask that ORACLE perform the following steps:1) accept a request for data from a requesting smart contract (denoted as "USER-SC" herein); 2) obtain the data from a data source; and 3) return the requested data. Additionally, to protect the confidentiality of a request, upon decrypting it, ORACLE never uses or reveals the data it contains, except to query the external source. These simple instructions, correctly carried out, define a strong, meaningful, but simple notion of security. Intuitively, they dictate that ORACLE acts as a trustworthy bridge between the external source and a requesting USER-SC.

Of course, many details of known secure communications are omitted here. ORACLE should communicate with both USER-SC and the external source over secure, i.e., tamperproof, channels. (If the external source is a web server, TLS is required). To communicate with USER-SC, ORACLE must be sure to scrape the right blockchain and digitally sign the response appropriately.) For example, if the external source is https://www.FountOfKnowledge.com, the time is 4 p.m. Eastern, and the requested data is "price for ticker INTC", the integrity of ORACLE guarantees that it will provide USER-SC with exactly the price of INTC as queried at 4 p.m. Eastern at https://www.FountOfKnowledge.com.

Confidentiality is another desirable property for oracles. As USER-SC sends a request to ORACLE in the clear on the blockchain, the request is public. There are many situations in which the nature of the request is sensitive, and its publication could be harmful. If USER-SC is a flight insurance contract, for example, and sends ORACLE a query request regarding a particular person's flight (request="Ether Air Flight 338"), the result would be that the person's flight plans could be revealed to the whole world. If USER-SC is a contract for financial trading, the request could leak information about a party's trades and portfolio. To protect the confidentiality of a request ("Req"), we can require that data in Req to the data source ("Src") be encrypted under a (public key) belonging to ORACLE. Continuing to leverage the TTP nature of ORACLE, we could then simply give ORACLE the information-flow constraint:

Upon decrypting Req, never reveal or use data in Req except to query Src.

There are other important oracle properties, such as availability, the last of the classical CIA (Confidentiality-Integrity-Availability) triad. A truly ideal service ORACLE would never go down, i.e. be unavailable. Availability also encompasses more subtle properties such as censorship resistance: An honest ORACLE will not single out particular smart contracts and deny their requests. The concept of a trusted third party is similar to the notion of an ideal functionality used to prove the security of cryptographic protocols in certain models. A blockchain can be modeled in similar terms, conceptualizing it in terms of a TTP that maintains an ideal ledger. Its instructions are to accept transactions, validate them, serialize them, and maintain them permanently on the ledger, which is an append-only data structure.

However, there is, of course, no perfectly trustworthy data source. Data may be benignly or maliciously corrupted due to faulty web sites, cheating service providers, or honest mistakes. If the data source isn't trustworthy, then even if ORACLE does operate exactly like a TTP as instructed above, it still doesn't completely meet the desired notion of security. Given a faulty source, the integrity property defined above no longer means that an oracle's answer is correct. If the true price of Intel is $40 and https://www.FountOfKnowledge.com misreports it as $50, for example, then ORACLE will send and answer of the incorrect value of $50 to USER-SC. ORACLE has no way to know whether the answers the data source provides to its queries are correct.

A bigger issue, of course, is the fact that our TTP for ORACLE is just an abstraction. No service provider is unconditionally trustworthy. Even the best-intentioned may be buggy or hacked. Therefore, there is no way for a user or smart contract to have absolute assurance that a service ORACLE will carry out its instructions faithfully.

SUMMARY

One aspect of the present disclosure relates to a system configured for interfacing at least one smart contact stored on a decentralized architecture with external data sources. The system may include one or more hardware processors configured by machine-readable instructions. The processor(s) may be configured to receive service level information from a user. The service level information may include required attributes of data sources. The processor(s) may be configured to publish, by an on-chain order-matching contract, a log of the required attributes. The on-chain order-matching contract may be stored on the same decentralized architecture as the smart contract. The processor(s) may be configured to receive, by the on-chain order-matching contract, bids from plural external data sources based on the log of the required reputation attributes. The processor(s) may be configured to select, by the on-chain order-matching contract, more than one of the plural external data sources as selected data sources and notifying the selected data sources, whereby the selected data sources can be used collectively to provide information requested by the at least one smart contract.

Another aspect of the present disclosure relates to a method for interfacing at least one smart contact stored on a decentralized architecture with external data sources. The method may include receiving service level information from a user. The service level information may include required attributes of data sources. The method may include publishing, by an on-chain order-matching contract, a log of the required attributes. The on-chain order-matching contract may be stored on the same decentralized architecture as the smart contract. The method may include receiving, by the on-chain order-matching contract, bids from plural external data sources based on the log of the required reputation attributes. The method may include selecting, by the on-chain order-matching contract, more than one of the plural external data sources as selected data sources and notifying the selected data sources, whereby the selected data sources can be used collectively to provide information requested by the at least one smart contract.

Yet another aspect of the present disclosure relates to a non-transient computer-readable storage medium having instructions embodied thereon, the instructions being executable by one or more processors to perform a method for interfacing at least one smart contact stored on a decentralized architecture with external data sources. The method may include receiving service level information from a user. The service level information may include required attributes of data sources. The method may include publishing, by an on-chain order-matching contract, a log of the required attributes. The on-chain order-matching contract may be stored on the same decentralized architecture as the smart contract. The method may include receiving, by the on-chain order-matching contract, bids from plural external data sources based on the log of the required reputation attributes. The method may include selecting, by the on-chain order-matching contract, more than one of the plural external data sources as selected data sources and notifying the selected data sources, whereby the selected data sources can be used collectively to provide information requested by the at least one smart contract.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Implementations disclosed herein return replies to data requests or queries made by or on behalf of a user smart contract, referred to as "requesting contract" herein, and, as noted above, sometimes denoted by "USER-SC." Implementations include an on-chain interface to the requesting contracts. The interface itself can be an on-chain contract that is denoted herein by "DATALINK-SC." The on-chain interface contract can be comprised of three primary contracts: a reputation contract, an order-matching contract, and an aggregating contract. The reputation contract can keep track of oracle-service-provider performance metrics. The order-matching contract can accept a proposed service level agreement (SLA), log SLA parameters, collect bids from oracle providers and select bids based on the performance metrics. The aggregating contract collects the oracle providers' responses and calculates the final collective result to be presented to the requesting contract.

Figure 1A:
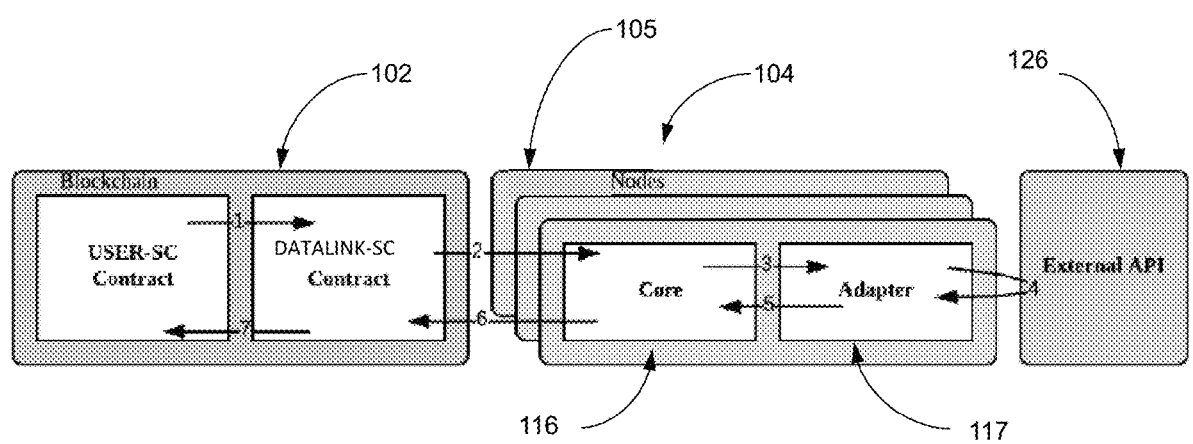
FIG. 1A illustrates the high-level architecture and workflow of on-chain contracts off-chain nodes and external data sources, in accordance with one or more implementations.

FIG. 1A illustrates a high-level architecture and workflow of a disclosed implementation. The architecture includes on-chain computing platform 102, off-chain remote platform 104 and external data sources 126. Off-chain remote platform includes plural oracle nodes 105, each having core software and an adapter (described in more detail below). At 1, USER-SC makes an on-chain request for information from an external source. At 2, the onchain contract DATA-LINK-SC logs and publishes an event for the external sources. At 3, the core software 116 of the oracle nodes 104 detects the event and routes the request to an adapter 117 of the oracle nodes 104 for proper formatting. The configuration and function of oracle nodes is discussed in greater detail below. At 4, each of the adapters performs a request to a corresponding group of external APIs of external data sources 126. At 5, the adapters process the responses from each external API and pass the responses back to the core software. At 6, the core software reports the data to DATA-LINK-SC and at 7, DATALINK-SC aggregates the responses and passes them back as a single response to USER-SC. As described below, this architecture and workflow provide an environment in which various techniques can be used to increase the accuracy and security of data returned to USER-SC.

Figure 1B:
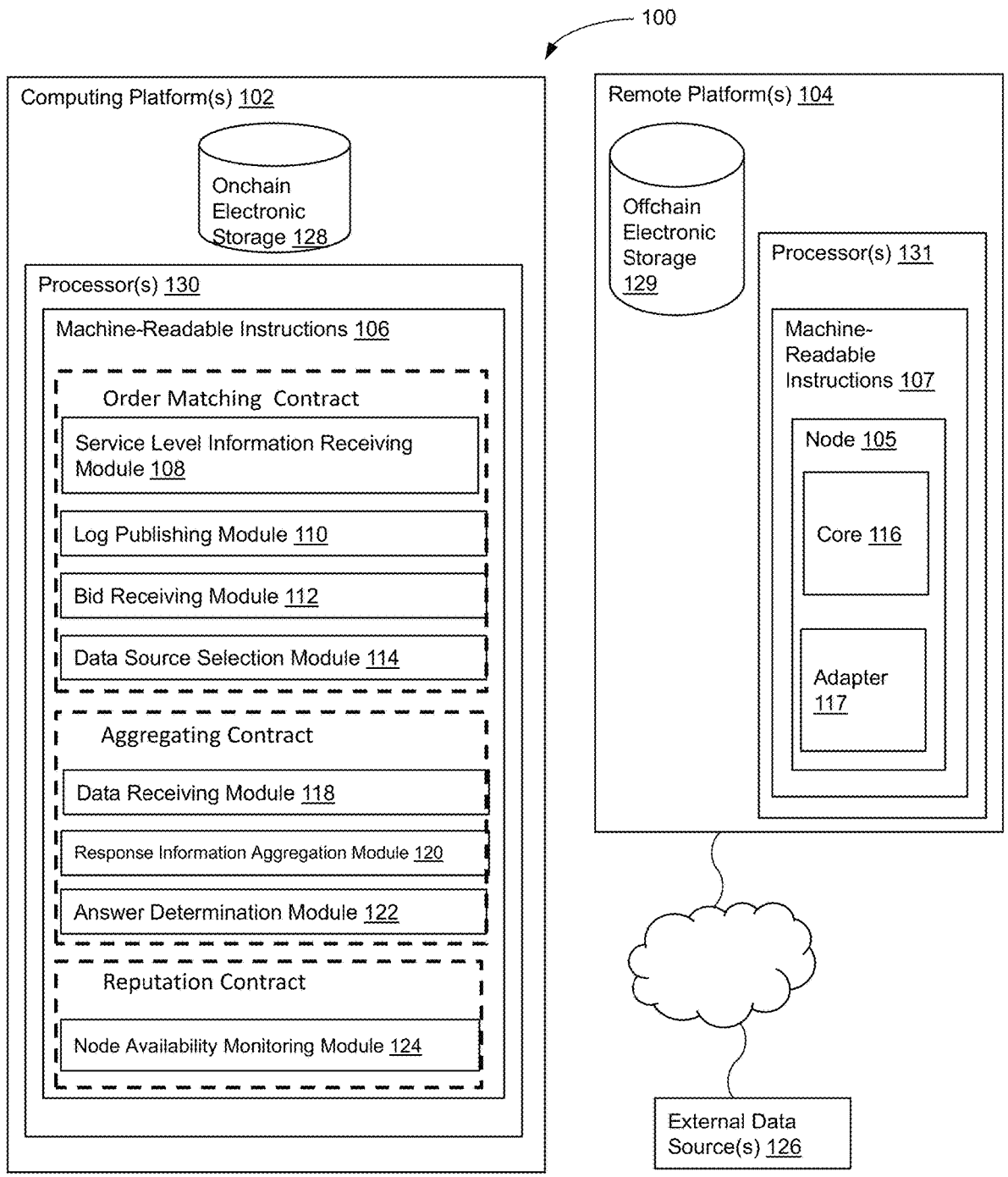
FIG. 1B illustrates a system configured for interfacing at least one smart contact stored on a decentralized architecture with external data sources, in accordance with one or more implementations.

FIG. 1B is a schematic block diagram of a system 100 configured for interfacing at least one smart contact stored on a decentralized architecture with external data sources, in accordance with one or more implementations. Like elements in FIG. 1B are labeled with the same reference numerals as in FIG. 1A. On-chain computing Platform 102 may be configured to communicate with one or more off-chain remote computing platforms 104 the include nodes 105. Computing Platform 102 represents a decentralized computing architecture, such as a blockchain, and may be configured by machine-readable instructions 106 which are stored on the blockchain in on-chain electronic storage 128 and executed by processor(s) 130. Electronic storage 128 and processor(s) 130 are shown as residing in one place in FIG. 1B. However, as is the nature of a decentralized environment, these elements can be distributed amongst many nodes that participate in the distributed architecture.

Remote Platform 104 can be an off-chain environment, i.e. the date is not necessarily stored and/or executed on the blockchain of computing platform 102. Remote platform 104 may be configured by machine-readable instructions 107 which are stored in off-chain electronic storage 129 and executed by processor(s) 131. Electronic storage 129 and processor(s) 131 are shown as residing in one place in FIG. 1. However, these elements can be distributed amongst plural devices. Machine-readable instructions 106 and 107 may include one or more instruction modules. The instruction modules may include computer program modules. The instruction modules may include one or more of service level information receiving module 108, log publishing module 110, bid receiving module 112, data source selection module 114, core module 116, adapter module 117, data receiving module 118, response information aggregation module 120, answer determination module 122, node availability monitoring module 124, and/or other instruction modules. Note that computing platform 102 includes modules that make up an order-matching contract, and aggregating contract, and a reputation contract which collectively define DATALINK-SC shown in FIG. 1A. While certain modules are shown on-chain and certain modules are shown off-chain in the implementation of FIG. 1B, these modules can be stored either on-chain or off-chain, unless otherwise specified herein.

Service level information receiving module 108 may be configured to receive service level information from a user. The service level information may include required attributes of external data sources 126. By way of non-limiting example, the required attributes may include at least one of query parameters, and a number of required external data sources. Log publishing module 110 may be configured to publish, by the on-chain order-matching contract, a log of the required attributes. The on-chain order-matching contract may be stored on the same decentralized architecture as the smart contract. Bid receiving module 112 may be configured to receive, by the on-chain order-matching contract, bids from plural external data sources based on the log of the required reputation attributes.

Data source selection module 114 may be configured to select, by the on-chain order-matching contract, more than one of the plural external data sources as selected data sources and notify the selected data sources, whereby the selected data sources can be used collectively to provide information requested by the at least one smart contract. The selecting can be accomplished based on matching the required attributes to reputation attributes of the data sources. The reputation attributes may include performance metrics of external data sources as collected by the on-chain reputation contract. By way of non-limiting example, the reputation may attribute include at least one of a total number of assigned requests to an oracle node that the oracle node has agreed to, a total number of requests that an oracle node has fulfilled, total number responses by an oracle node that have been deemed acceptable by requesting smart contracts, and/or an average time it takes for the oracle node to respond to requests. As shown in FIG. 1B, service level information receiving module, log publishing module 110, Bid receiving module 112, and data source selection module 114 can be part of the on-chain order-matching contract.

The external data sources 126 may be coupled to plural decentralized oracle nodes 105 in the manner described in more detail below. Instead of contacting the external data sources 126 directly, the required attributes are submitted to the order-matching contract. The submission of the proposal to the order-matching contract triggers log publishing module 110 to publish a log that oracle nodes 107 can monitor and filter based on their capabilities and service objectives. The oracle nodes 105 then choose whether to bid on the proposal or not, with the order-matching contract only accepting bids from oracle nodes 105 that meet the required attributes. When an oracle node 105 bids on a contract, they can commit to the bid by attaching a predefined penalty value, in cryptocurrency for example. that will be lost in the vent of "misbehavior" by the oracle node 105.

Bids can be accepted during a bidding time window. Once enough qualified bids have been received and the bidding window has ended, the requested number of oracle nodes 105 is selected from the pool of bids. As noted above, the requested number can be specified in the SLA attributes. Penalty payments that were offered during the bidding process are returned to oracle nodes 105 who were not selected. The selected oracle nodes are then notified and can perform the requisite assignment, such as provision of information, in the manner described below.

Log publishing module 110 may be configured to log an event corresponding to a request for information requested by the at least one smart contract. Data source receiving module 118 may be configured to receive, by the on-chain aggregating contract, response information from the selected data oracle nodes 105 as a response to the event. The response information from the selected data sources may be received from a network of the off-chain oracle nodes 105 which independently harvest responses from a corresponding set of external data sources through an external API as described below. The oracle nodes 105 may send cryptographic commitments before sending the response.

Response information aggregation module 120 may be configured to aggregate, by the on-chain aggregating contract, the response information. Answer determination module 122 may be configured to determine, by the on-chain aggregating contract, an aggregated answer and provide the aggregated answer to the at least one smart contract as a response to the request from the at least one smart contract. Answer determination module 122 may be configured to determine the aggregated answer through a consensus protocol applied to the oracle nodes 105. The consensus protocol may be based on threshold signatures. Node availability monitoring module 124 may be configured to monitor the availability and correctness of oracle nodes 105 and validate the oracle nodes based on the availability and correctness information. In some implementations, node availability module 124 can be part of the on-chain reputation contract.

Figure 1C:
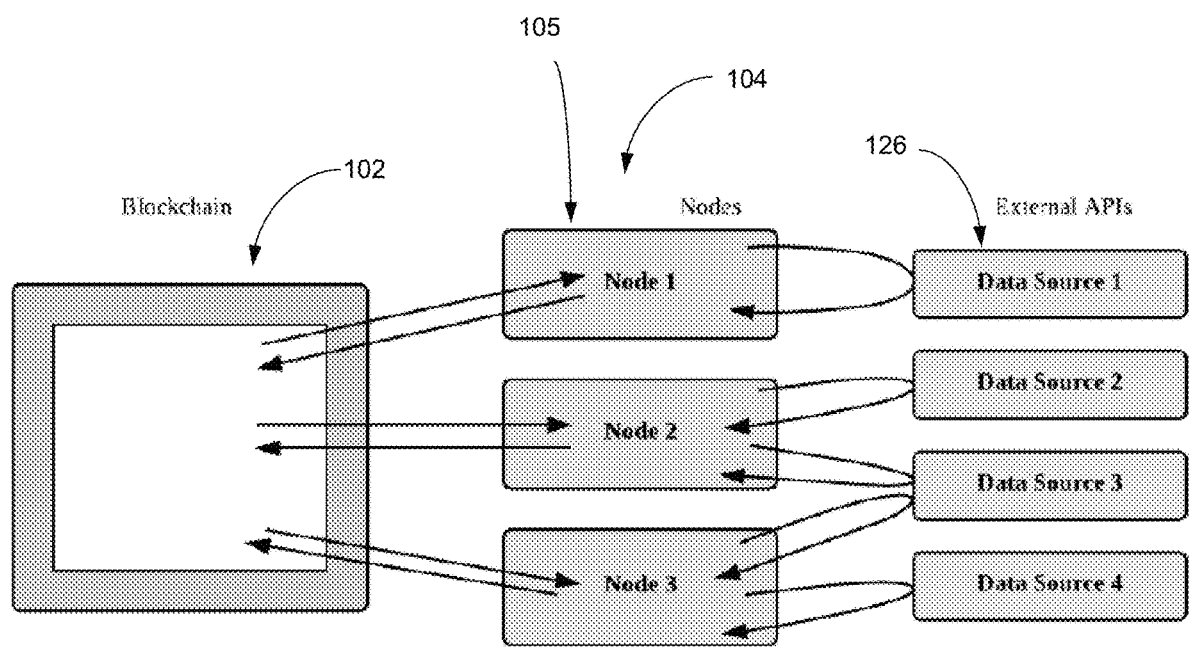
FIG. 1C illustrates a distributed oracle node and distributed data source architecture, in accordance with one or more implementations.

FIG. 1C illustrates a distributed system of oracle nodes 105 where like elements from FIGS. 1A and 1B have the same reference numerals. In FIG. 1C computing platform 102 is on a blockchain and includes the requesting smart contract and the oracle contract as discussed above. Remote computing platform 104 includes multiple oracle nodes that are each configured to query a set of one or more data sources 126 through data source APIs. Note that the sets of data sources corresponding to each oracle node need not be mutually exclusive, i.e. there can be overlap amongst the sets of data sources. While only 3 nodes 105 and 4 data sources 126 are shown in FIG. 1C, there can by many more of each element as required for accuracy and available computing resources. Also, one oracle node 105 could query a set of many data sources 126 even though FIG. 1C, for simplicity, shows a maximum of 2 data sources 126 corresponding to a single oracle node 105.

Computing platform(s) 102, remote platform(s) 104, and/or external data sources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform 102, remote platform(s) 104, and/or external data sources 126 may be operatively linked via some other communication media.

A given computing platform may include one or more processors configured to execute computer program modules. By way of non-limiting example, the given client computing platform 104 may include one or more of a desktop computer, a laptop computer, a handheld computer, a tablet computing platform, a NetBook, a Smartphone, a gaming console, and/or other computing platforms. External data 126 may include sources of information, APIs, external entities participating with system 100, and/or other resources.

Electronic storage 128 and 129 may comprise non-transitory storage media that electronically stores information. The electronic storage media of electronic storage 128 and 129 may include one or both of system storage that is provided integrally (i.e., substantially non-removable) with a computing platform and/or removable storage couple via for example, a port (e.g., a USB port, a firewire port, etc.) Electronic storage 128 and 129 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 and 129 may include one or more virtual storage resources (e.g., cloud storage, a virtual private network, and/or other virtual storage resources). Electronic storage 128 and 129 may store software algorithms, information determined by processor(s) 130 and processor(s) 131, information received from computing platforms, and/or other information that enables the functions described herein.

Processor(s) 130 and 131 may be configured to provide information processing capabilities. As such, processor(s) 130 and 131 may include one or more of a digital processor, an analog processor, a digital circuit designed to process information, an analog circuit designed to process information, a state machine, and/or other mechanisms for electronically processing information. Although processor(s) 130 and 131 are shown in FIG. 1 as a single entity, this is for illustrative purposes only. In some implementations, processor(s) 130 and 131 may include a plurality of processing units distributed amongst multiple devices. These processing units may be physically located within the same device or may represent processing functionality of a plurality of devices operating in coordination. Processor(s) 130 and 131 may be configured to execute the disclosed modules and/or other modules by software; hardware; firmware; some combination of software, hardware, and/or firmware; and/or other mechanisms for configuring processing capabilities. As used herein, the term "module" may refer to any component or set of components that perform the functionality attributed to the module. This may include one or more physical processors during execution of processor readable instructions, the processor readable instructions, circuitry, hardware, storage media, or any other components.

As noted above, the external data sources can be coupled to the on-chain contracts through an off-chain decentralized network of oracle nodes. For example, the oracle nodes can be connected to a blockchain, such as the Ethereum network. The nodes are referred to as "off-chain" since they need not be on the same blockchain as the requesting contract. The oracle nodes can independently harvest responses to off-chain requests. The individual responses can be aggregated, via one of several possible consensus mechanisms for example, into a global response that is returned to a requesting contract USER-SC in the manner described below.

Core software 116 is responsible for interfacing with the blockchain, scheduling, and balancing work across its various external services. Work done by the oracle nodes 105 can be formatted as "assignments." Each assignment can be a set of smaller job specifications, known as subtasks, which can be processed as a pipeline. Each subtask has a specific operation it performs, before passing its result onto the next subtask, and ultimately reaching a final result. Adapters 117 can include a schema system based on JSON Schema, that can be used to specify what inputs each oracle node needs and how the inputs should be formatted.

Implementations disclosed herein address oracle security issues through the use of a network decentralized oracle nodes. As noted above, the use of a single data source raises issues of data integrity. A simple way to deal with a faulty single source Src is to obtain data from multiple sources, i.e., distribute the data source. A trustworthy ORACLE can query a collection of sources $Src_1$; $Src_2$ . . . $Src_k$, obtain responses $a_1$; $a_2$ . . . $a_k$, and aggregate them into a single answer $A=agg(a_1; a_2 \ldots ak)$. ORACLE could do this in multiple ways. One example is majority voting. If a majority of sources return the identical value a, the function agg returns a; otherwise it returns an error. In this case, provided that a majority (>k=2) sources are functioning correctly, ORACLE will always return a correct value A. Other functions can ensure robustness against erroneous data or handle fluctuations in data values over time (e.g, stock prices). For example, agg might discard outliers (e.g., the largest and smallest values $a_j$) and output the mean of the remaining ones.

Of course, faults may be correlated across data sources in a way that weakens the assurances provided by aggregation. If site $Src_1$=EchoEcho.com obtains its data from $Src_2$=TheHorsesMouth.com, an error at $Src_2$ will always imply an error at $Src_1$. More subtle correlations between data sources can also occur. The independence of data sources could be monitored and recorded in an easily digestible way so that oracle nodes and users can avoid undesired correlations.

Just as sources can be distributed, ORACLE itself can be approximated as a distributed system. In other words, instead of a single monolithic oracle node O, there can be a collection of n different oracle nodes $O_1, O_2, \ldots, O_n$. Each oracle $O_i$ ich may or may not overlap with those of other oracles. $O_i$ aggregates responses from its set of data sources and outputs its own distinct answer $A_i$ to a query Req. Some of these oracles may be faulty. So clearly the set of all oracles' answers $A_1, A_2, \ldots, A_n$ will need to be aggregated in a trustworthy way into a single, authoritative value A.

Implementations disclosed herein can utilize "in-contract aggregation." DATALINK-SC, the on-chain oracle contract, can aggregate oracle responses, through the aggregation contract described above with respect to FIG. 1B. The aggregation contract can be separate from DATALINK-SC, but for conceptual simplicity they are shown to be integral in the Figures. DATALINK-SC will compute $A=Agg(A_1, A_2, \ldots, A_n)$ for some function Agg (similar to agg, described above), and send the result A to USER, such as a requesting contract. This approach is practical for small n, and has several distinct benefits:

Conceptual simplicity: Even though the oracle is distributed, a single entity, DATALINK-SC, performs aggregation.

Trustworthiness: As DATALINK-SC's code can be publicly inspected on the blockchain, its correct behavior can be verified.

Flexibility: DATALINK-SC can implement most desired aggregation functions (majority, averaging, etc.).

This approach does not, in and of itself, prevent the problem of "freeloading", i.e. where an oracle node merely copies the output of another oracle node. A cheating oracle $O_z$ can observe the response $A_i$ of another oracle $O_i$ and copy it. In this way, oracle $O_z$ avoids the expense of querying data sources, which may charge per-query fees. Of course, freeloading weakens security by undermining the diversity of data source queries and also disincentivizes oracle nodes from responding quickly because responding slowly and freeloading is likely to be a less resource intensive strategy.

Implementations disclosed herein leverage a known commit/reveal scheme to address the freeloading issue. In a first round of communication, oracle nodes send DATALINK-SC cryptographic commitments to their responses. After DATALINK-SC has received a quorum of responses, it initiates a second round of communication in which the oracle nodes reveal their responses. Algorithm 1 below shows a simple sequential protocol, using a commit/reveal scheme, that guarantees availability given 3f+1 nodes. Oracle node responses are decommitted, and thus exposed to a potential freeloader only after all commitments have been made, thereby excluding the freeloader from copying a response of other oracle nodes.

Algorithm 1: InChain Aggregation $(\{O_i\}^n_{i=1})$
1: Wait until Req is received from USER-SC.
2: Sid$\leftarrow_s$ SID
3: Broadcast (request, sid).
4: Wait until set C of 2f+1 messages (commit, $c_i$=Commit$_{r_i}(A_i)$, sid) from distinct $O_i$ are received.
5: Broadcast (committed, sid).
6: Wait until set D of f+1 distinct valid decommitments (decommit, $(r_i, A_i)$, sid) are received where, for some A, all $A_i$=A.
7: Send (Answer, A, sid) to USER-SC.

On-chain protocols can leverage block times to support synchronous protocol designs. However, oracle nodes obtain data from sources that may have highly variable response times, and decommitment times by nodes can vary due to, e.g., use of different gas prices in Ethereum. To ensure the fastest possible protocol responsiveness, therefore, Algorithm 1 is designed as an asynchronous protocol. Commit$_r$(A) denotes a commitment of value A with witness r, while SID denotes the set of valid session ids. The protocol assumes authenticated channels among all participants. It is apparent that Algorithm 1 will terminate successfully. Given 3f+1 nodes in total, at most f are faulty, so at least 2f+1 will send commitments in Step 4. Of those commitments, at most f come from faulty nodes, so at least f+1 come from honest nodes. All such commitments will eventually be decommitted. Additionally, A will be correct in Alg.1. Of the f+1 decommitments on the single value A, at least one has to come from an honest node. A more sophisticated, concurrent variant of the algorithm could also be used.

Alternatively, an "off-chain aggregation" (OCA) protocol can be used. An example of an OCA protocol is set forth in Algorithms 2 and 3 below, respectively the DistOracle and RewardOracles algorithms, that are an example of OCA. Algorithms 2 and 3 use condensed notation (rather than including witnesses explicitly, as in Algorithm 1) we let simply let Commit denote a commitment function. Note that all participants can see the messages received by DATA-LINK-SC, as it is on-chain. Let $\Sigma^*$ be the first valid signature $\Sigma$ sent to DATALINK-SC. In Algorithm 3, we let PS* denote a set of decommitments received by PROVIDER whose partial signatures yield $\Sigma^*$. (PS* could come from an oracle node that sent $\Sigma^*$, but need not. Any oracle node with a partial signature in PS* is incentivized to send PS).

Algorithm 2: DistOracle(f, n, i, $sk_i=x_i$, pk, Src) (code for $O_i$)
Jointly generate ephemeral key:
1: Execute distributed key-generation protocol and receive ($e_i$, e).
Obtain data:
2: Obtain $A_i$ from Src.
Generate partial signature:
i
3: Compute $\sigma^{(e)}$ ($=cx_i+e_i$, for c=H(m||e), where m=$A_i$).
( )
Commit round:
i
4: Broadcast commitment $comm_i$=Commit($\sigma^{(e)}$, $A_i$); i.
6: Send C to PROVIDER.
5: Wait until a set $C_i$ of n−f valid commitments from distinct oracles is received.
i
Prepare round:
7: Broadcast prepared.
8: Wait until n−f distinct prepared messages are received.
Reveal/decommit round:
i
9: Broadcast decommitment of ($\sigma^{(e)}$, $A_i$) for $comm_i$.
10: Wait until a set PS of ≥t valid decommitments are received.
Full signature computation:
11: if no valid $\Sigma$ has yet been received by DATALINK-SC then
12: Aggregate partial signatures in PS into $\Sigma=Sig_{sk}[A]$.
13:
Send $\Sigma$ to DATALINK-SC.
14: Send PS to PROVIDER.
15: end if
Algorithm 3: RewardOracles (code for PROVIDER)
C−
1: Wait until set of n f commitment sets ($C_i$) from distinct oracles and PS* are received.
2: for every oracle $O_j$ do
∈C
3: if $\sigma_j$ PS* and >2f sets in include commitments to $\sigma_j$ from $O_j$ then
4: Send $reward to $O_j$.
5: end if
6: end for In-contract aggregation can be relatively expensive because it incurs the cost of transmitting and processing on-chain O(n) oracle messages (commits and reveals for $A_1$, $A_2$, . . . , $A_n$). In permissioned blockchains, this overhead may be acceptable. In permissionless (public) blockchains with on-chain transaction fees such as Ethereum, if n is large, the costs can be prohibitive. A more cost-effective approach is to aggregate oracle node responses off-chain and transmit a single message to DATALINK-SC.

The problem of achieving a consensus value A in the face of potentially faulty nodes is much like the problem of consensus that underpins blockchains themselves. Given a predetermined set of oracles, one might consider using a classical Byzantine Fault Tolerant (BFT) consensus algorithm to compute A. Classical BFT protocols, however, aim to ensure that at the end of a protocol invocation, all honest nodes store the same value, e.g., in a blockchain, that all nodes store the same fresh block. With oracle nodes, the goal is different. It is desirable to ensure that DATALINK-SC (and then USER-SC) obtains aggregate answer A=Agg($A_1$, $A_2$, . . . , $A_n$) without participating in the consensus protocol and without needing to receive answers from multiple oracles. The problem of freeloading still needs to be addressed however. A protocol involving threshold signatures can be used to address freeloading. Such signatures can be realized using any of a number of signature schemes, but are especially simple to implement using Schnorr signatures. In this approach, oracle nodes have a collective public key pk and a corresponding private key sk that is shared among $O_1, O_2, \ldots, O_n$ in a (t, n)-threshold manner. Such a sharing means that every node $O_i$ has a distinct private/public keypair ($sk_i$, $pk_i$). $O_i$ can generate a partial signature $\sigma_i=Sig_{ski}[A_i]$ that can be verified with respect to $pk_i$. A feature of this scheme is that partial signatures on the same value A can be aggregated across any set of t oracles to yield a single valid collective signature $\Sigma=Sig_{sk}[A]$ on an answer A. No set of t−1 oracle nodes, however, can produce a valid signature on any value. The single signature $\Sigma$ thus implicitly embodies the partial signatures of at least t oracles.

Threshold signatures can be realized by letting $\Sigma$ consist explicitly of a set of t valid, independent signatures from individual nodes. Threshold signatures have similar security properties to this naïve approach. But they provide a significant on-chain performance improvement: They reduce the size and cost of verifying $\Sigma$ by a factor of t.

Oracle nodes can just generate and broadcast partial signatures until t such partial signatures enable the computation of $\Sigma$. Again, though, the problem of freeloading arises. This is solved with a financial mechanism: An entity PROVIDER (realizable as a smart contract) rewards only oracle nodes that have sourced original data for their partial signatures. In a distributed setting, determining which oracle nodes qualify for payment turns out to be tricky. Oracle nodes may intercommunicate off-chain and there no longer would be a single authoritative entity (DATALINK-SC) receiving responses. In such a case, it would be difficult to identify eligible payees directly among participating oracle nodes. Consequently, PROVIDER must obtain evidence of misbehavior from the oracle nodes themselves, some of which may be untrustworthy. Implementations herein use a form of consensus mechanism to ensure that PROVIDER does not pay freeloading oracle nodes.

The protocols described above ensure availability and correctness in the face of up to f faulty oracles nodes. Additionally, trusted hardware, can be leveraged to protect against corrupted oracles providing incorrect responses. Trusted hardware, however, might not be adequate to provide definitive protection because some users may not trust trusted hardware and trusted hardware cannot protect against node downtime, only against node misbehavior. It is therefore advantageous to ensure that users can choose the most reliable oracle nodes and minimize the probability of USER-SC relying on >f faulty oracle nodes. To this end, implementations disclosed herein can include four key security services: Validation, Reputation, and Certification. All of these services can be part of the reputation contract described above. These security services can be executed in a decentralized environment and cannot block oracle node participation or alter oracle responses.

The validation service monitors on-chain oracle node behavior, providing an objective performance metric that can guide user selection of oracle nodes. The validation service can monitor oracle nodes for:

Availability: The Validation System should record failures by an oracle to respond in a timely way to queries. It will compile ongoing uptime statistics.

Correctness: The Validation System should record apparent erroneous responses by an oracle as measured by deviations from responses provided by peers. "Deviation" must be defined in a data-specific manner. For simple Boolean responses—for example, whether a flight arrived on time—deviation simply means a response opposite that of the majority. For, say, the temperature of a city, which may vary legitimately across sensors and sources, deviation may mean significant numerical deviation. Of course, for various reasons, e.g., broken sensors, even a well-functioning oracle node may deviate from the majority answer some fraction of the time.

With the on-chain aggregation described above, such monitoring is straightforward, as all oracle node activity is visible to DATALINK-SC. However, when using the above-described off-chain aggregation system, the oracles themselves perform the aggregation. Consequently, DATALINK-SC does not have directly visibility into oracle responses and cannot itself monitor availability and correctness. Fortunately, oracle nodes digitally sign their responses, and thus, as a side effect, generate non-reputable evidence of their answers. Therefore, the validation service can be implemented as a smart contract that rewards oracle nodes for submitting evidence of deviating responses. In other words, oracle nodes would be incentivized to report apparently erroneous behavior.

Availability is somewhat trickier to monitor, as oracle nodes of course don't sign their failures to respond. Instead, a proposed protocol enhancement can require oracle nodes to digitally sign attestations to the set of responses they have received from other oracle nodes. The validation contract would then accept (and again reward) submission of sets of attestations that demonstrate consistent non-responsiveness by an underperforming oracle node to its peers. In both the on-chain and off-chain cases, availability and correctness statistics for oracle nodes will be visible on-chain. Users/developers will thus be able to view the statistics in real time through an appropriate front end, such as a Dapp in Ethereum or an equivalent application for a permissioned blockchain (a blockchain complying with the Enterprise Ethereum Alliance specification. for example).

The reputation service records and publishes user ratings of oracle nodes thereby offering a means for users to evaluate oracle performance holistically. Validator service reports are likely to be a major factor in determining oracle node reputations and placing these reputations on a firm footing of trust. Factors beyond on-chain history, though, can provide essential information about oracle node security profiles. These may include users' familiarity with brands of the nodes, operating entities, and architectures. The reputation service can include an onchain component where users' ratings would be available for other smart contracts to reference. Additionally, reputation metrics should be easily accessible off-chain where larger amounts of data can be efficiently processed and more flexibly weighted.

For a given oracle node operator, the reputation service can support, for example, the following metrics both at the granularity of specific assignment types in general for all types supported by a node:

Total number of assigned requests: The total number of past requests that an oracle has agreed to, both fulfilled and unfulfilled.

Total number of completed requests: The total number of past requests that an oracle has fulfilled. This can be averaged over number of requests assigned to calculate completion rate.

Total number of accepted requests: The total number of requests that have been deemed acceptable by calculating contracts when compared with peer responses. This can be averaged over total assigned or total completed requests to get insight into accuracy rates.

Average time to respond: While it may be necessary to give oracle responses time for confirmation, the timeliness of their responses will be helpful in determining future timeliness. Average response time is calculated based on completed requests.

Amount of penalty payments: If penalty payments were locked in to assure a node operator's performance, the result would be a financial metric of an oracle provider's commitment not to engage in an "exit scam" attack, where the provider takes users' money and doesn't provide services. This metric would involve both a temporal and a financial dimension.

High-reputation services are strongly incentivized in any market to behave correctly and ensure high availability and performance. Negative user feedback will pose a significant risk to brand value, as do the penalties associated with misbehavior. Consequently, a virtuous circle is established in which well-functioning oracle nodes develop good reputations and good reputations give rise to incentives for continued high performance.

While the validation and reputation services address a broad range of faulty behaviors by oracle nodes, a certification service may be implemented to prevent and/or remediate rare but catastrophic events, such as en bloc cheating in the form of Sybil and mirroring attacks. As described above, the aggregation protocols seek to prevent freeloading in the sense of dishonest nodes copying honest nodes' answers. But neither protects against "Sybil attacks." Such attacks involve an adversary that controls multiple, ostensibly independent oracle nodes. This adversary can attempt to dominate the oracle node pool, causing more than f oracles to participate in the aggregation protocol and provide false data at strategic times, e.g., in order to influence large transactions in high-value contracts. Quorums of cheating oracle nodes can also arise not just under the control of a single adversary, but also through collusion among multiple adversaries. Attacks or faults involving >f oracle nodes are especially pernicious in that they are undetectable from on-chain behavior alone. Additionally, to reduce operational costs, a Sybil attacker can adopt a behavior called mirroring, in which it causes oracles to send individual responses based on data obtained from a single data-source query. In other words, misbehaving oracle nodes may share data off-chain but pretend to source data independently. Mirroring benefits an adversary whether or not it chooses to send false data. It poses a much less serious security threat than data falsification but can slightly degrade security in that it eliminates the error correction resulting from diversified queries against a given source Src. For example, if https://www.datasource.com emits erroneous data due to, say, a sporadically triggered bug, multiple queriers may still obtain a correct majority result. Sybil attacks resulting in false data, mirroring, and collusion in general may be eliminated by the use of trusted hardware.

The certification service provides general integrity and availability assurance, detecting and helping prevent mirroring and colluding oracle quorums in the short-to-medium term. The certification service would issue endorsements of high-quality oracle node providers. Again, the service will rate providers for the benefit of users and need not dictate oracle node participation or non-participation in the system. The certification service supports endorsements based on several features of oracle node deployment and behavior. The certification service can monitor the validation service statistics on oracle nodes and perform post-hoc spot-checking of on-chain answers—particularly for high-value transactions—comparing them with answers obtained directly from reputable data sources. With sufficient demand for an oracle node provider's data, there is enough economic incentive to justify off-chain audits of oracle node providers, confirming compliance with relevant security standards, such as relevant controls in the Cloud Security Alliance (CSA) Cloud Controls Matrix [26], as well as providing useful security information that they conduct proper audits of oracles' source and bytecode for smart contracts.

In addition to the reputation metrics, automated on-chain and automated off-chain systems for fraud detection. For example, if all oracle nodes agree that the moon is made of green cheese, they can cause USER-SC to ingest this falsehood. MOON COMPONENTS={GREEN CHEESE} will be recorded on the blockchain, however, and visible in a post-hoc review.

The implementations can utilize a token, such as a cryptocurrency token, to make payments to oracle node operators for the retrieval of data from off-chain data feeds, formatting of data into blockchain readable formats, off-chain computation, and uptime guarantees they provide as operators. In order for a smart contract on networks like Ethereum to use an oracle node, they could be required to pay their chosen oracle node operator using the tokens, with prices being set by the node operator based on demand for the off-chain resource their node provides, and the supply of other similar resources. The token can be an is an ERC20 compliant token, with the additional ERC223 "transfer and call" functionality of transfer(address, uint256, bytes), allowing tokens to be received and processed by contracts within a single transaction.

Figure 2:
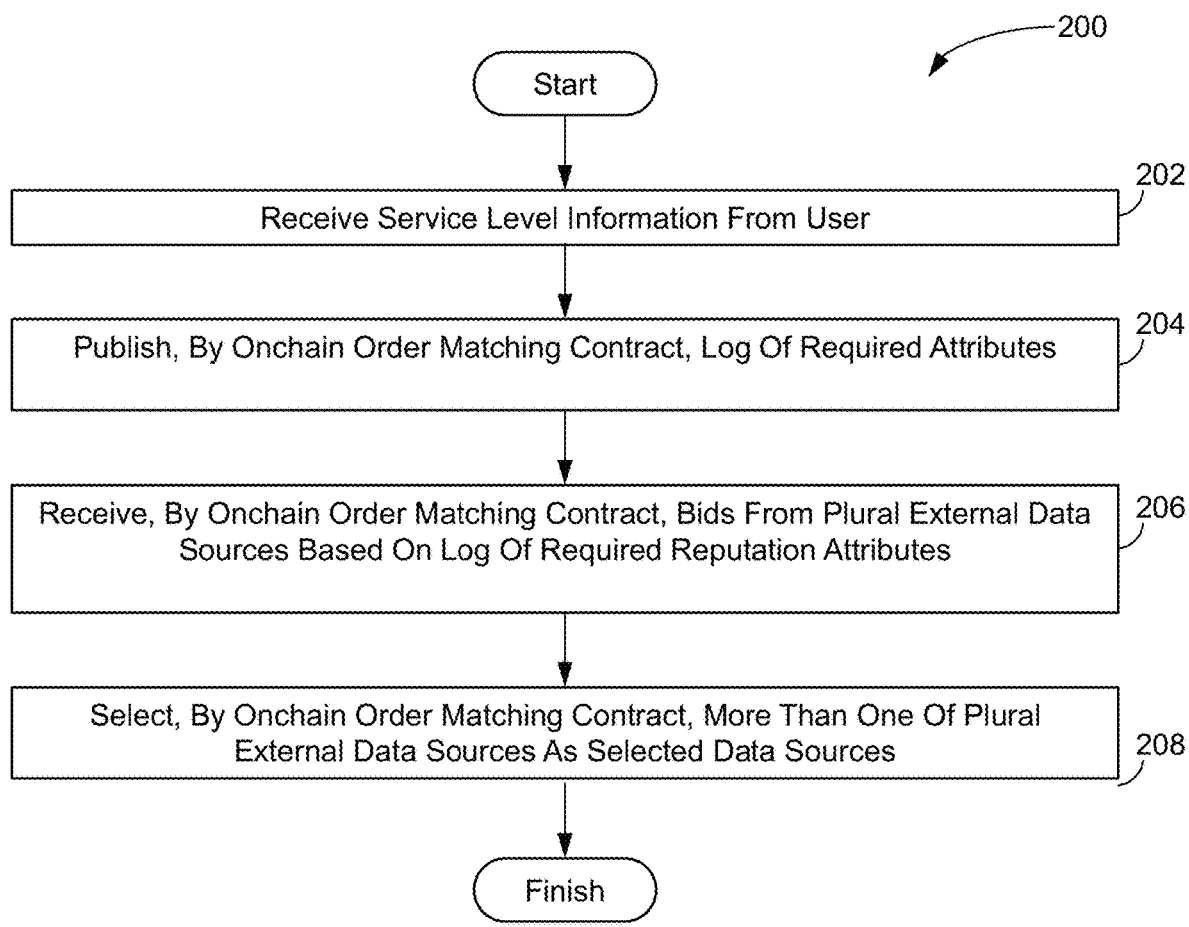
FIG. 2 illustrates a method for interfacing at least one smart contact stored on a decentralized architecture with external data sources, in accordance with one or more implementations.

FIG. 2 illustrates a method 200 for interfacing at least one smart contact stored on a decentralized architecture with external data sources, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving service level information from a user. The service level information may include required attributes of data sources. Operation 202 may be performed by one or more hardware processors configured by machine-readable instructions including a module that is the same as or similar to service level information receiving module 108, in accordance with one or more implementations.

An operation 204 may include publishing, by an on-chain order-matching contract, a log of the required attributes. The on-chain order-matching contract may be stored on the same decentralized architecture as the smart contract. Operation 204 may be performed by one or more hardware processors configured by machine-readable instructions including a module that is the same as or similar to log publishing module 110, in accordance with one or more implementations.

An operation 206 may include receiving, by the on-chain order-matching contract, bids from plural external data sources based on the log of the required reputation attributes. Operation 206 may be performed by one or more hardware processors configured by machine-readable instructions including a module that is the same as or similar to bid receiving module 112, in accordance with one or more implementations.

An operation 208 may include selecting, by the on-chain order-matching contract, more than one of the plural external data sources as selected data sources and notifying the selected data sources, whereby the selected data sources can be used collectively to provide information requested by the at least one smart contract. Operation 208 may be performed by one or more hardware processors configured by machine-readable instructions including a module that is the same as or similar to data source selection module 114, in accordance with one or more implementations. All other functions described above can be incorporated into the method illustrated in FIG. 2.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:
1. A system configured for interfacing at least one smart contact stored on a decentralized architecture with external data sources, the system comprising:
one or more hardware processors configured by machine-readable instructions to:

receive service level information from a user, the service level information including required attributes of data sources;

publish, by an on-chain order-matching contract, a log representing the required attributes, wherein the on-chain order-matching contract is stored on the same decentralized architecture as the smart contract;

receive, by the on-chain order-matching contract, bids from plural external data sources based on the log representing the required attributes; and select, in accordance with a representation recorded in the on-chain order-matching contract, at least one of the plural external data sources as selected data sources and notifying the selected data sources, whereby the selected data sources can be used collectively to provide information requested by the at least one smart contract.

2. The system of claim 1, wherein the one or more hardware processors are further configured by machine-readable instructions to:

log an event corresponding to a request for information requested by the at least one smart contract;

receive, by an on-chain aggregating contract, response information from the selected data sources as a response to the event, wherein the on-chain aggregating contract is stored on the same decentralized architecture as the smart contract;

aggregate, by the on-chain aggregating contract, the response information; and determine, by the on-chain aggregating contract, an aggregated answer and providing the aggregated answer to the at least one smart contract as a response to the request from the at least one smart contract.

3. The system of claim 1, wherein the required attributes include reputation attributes and further comprising collecting, by an on-chain reputation contract, performance metrics of external data sources and wherein the selecting is accomplished based on matching the performance metrics to the reputation attributes, wherein the on-chain reputation contract is stored on the same decentralized architecture as the smart contract.

4. The system of claim 3, wherein the required attributes also include at least one of query parameters, and a number of required external data sources.

5. The system of claim 3, wherein the receiving response information from the selected data sources comprises receiving the response information from a decentralized network of off-chain oracle nodes which independently harvest responses from a corresponding set of external data sources through an external API.

6. The system of claim 5, wherein receiving the response information from a network of off-chain oracle nodes comprises receiving cryptographic commitments from the oracle nodes and subsequently receiving the response information from the oracle nodes.

7. The system of claim 5, wherein the one or more hardware processors are further configured by machine-readable instructions to determine an aggregated answer through a consensus protocol applied to the oracle nodes and providing the aggregated answer to the at least one smart contract as a response to the request from the at least one smart contract.

8. The system of claim 7, wherein the consensus protocol is based on threshold
signatures.

9. The system of claim 5, wherein the one or more hardware processors are further configured by machine-readable instructions to monitor the oracle nodes availability and correctness and validating the oracle nodes based on availability and correctness information.

10. The system of claim 3, wherein the reputation attributes include at least one of a total number of assigned requests to an oracle node that the oracle node has agreed to, a total number of requests that an oracle node has fulfilled, total number responses by an oracle node that have been deemed acceptable by requesting smart contracts, and/or an average time it takes for the oracle node to respond to requests.

11. A method for interfacing at least one smart contact stored on a decentralized architecture with external data sources, the method comprising:

receiving service level information from a user, the service level information including required attributes of data sources;

publishing, by an on-chain order-matching contract, a log representing the required attributes, wherein the on-chain order-matching contract is stored on the same decentralized architecture as the smart contract;

receiving, by the on-chain order-matching contract, bids from plural external data sources based on the log representing the required attributes; and selecting, in accordance with a representation recorded in the on-chain order-matching contract, at least one of the plural external data sources as selected data sources and notifying the selected data sources, whereby the selected data sources can be used collectively to provide information requested by the at least one smart contract.

12. The method of claim 11, further comprising:

logging an event corresponding to a request for information requested by the at least one smart contract;

receiving, by an on-chain aggregating contract, response information from the selected data sources as a response to the event, wherein the on-chain aggregating contract is stored on the same decentralized architecture as the smart contract;

aggregating, by the on-chain aggregating contract, the response information; and determining, by the on-chain aggregating contract, an aggregated answer and providing the aggregated answer to the at least one smart contract as a response to the request from the at least one smart contract.

13. The method of claim 11, wherein the required attributes include reputation attributes and further comprising collecting, by an on-chain reputation contract, performance metrics of external data sources and wherein the selecting is accomplished based on matching the performance metrics to the reputation attributes, wherein the on-chain reputation contract is stored on the same decentralized architecture as the smart contract.

14. The method of claim 13, wherein the required attributes also include at least one of query parameters, and a number of required external data sources.

15. The method of claim 13, wherein the receiving response information from the selected data sources comprises receiving the response information from a decentralized network of off-chain oracle nodes which independently harvest responses from a corresponding set of external data sources through an external API.

16. The method of claim 15, wherein receiving the response information from a network of off-chain oracle nodes comprises receiving cryptographic commitments from the oracle nodes and subsequently receiving the response information from the oracle nodes.

17. The method of claim 15, further comprising determining an aggregated answer through a consensus protocol applied to the oracle nodes and providing the aggregated answer to the at least one smart contract as a response to the request from the at least one smart contract.

18. The method of claim 17, wherein the consensus protocol is based on threshold signatures.

19. The method of claim 15, further comprising monitoring the oracle nodes availability and correctness and validating the oracle nodes based on availability and correctness information.

20. The method of claim 13, wherein the reputation attributes include at least one of a total number of assigned requests to an oracle node that the oracle node has agreed to, a total number of requests that an oracle node has fulfilled, total number responses by an oracle node that have been deemed acceptable by requesting smart contracts, and/or an average time it takes for the oracle node to respond to requests.

21. A non-transient computer-readable storage medium having instructions embodied thereon, the instructions being executable by one or more processors to perform a method for interfacing at least one smart contact stored on a decentralized architecture with external data sources, the method comprising:

receiving service level information from a user, the service level information including required attributes of data sources;

publishing, by an on-chain order-matching contract, a log representing the required attributes, wherein the on-chain order-matching contract is stored on the same decentralized architecture as the smart contract;

receiving, by the on-chain order-matching contract, bids from plural external data sources based on the log representing the required attributes; and selecting, in accordance with a representation recorded in the on-chain order-matching contract, at least one of the plural external data sources as selected data sources and notifying the selected data sources, whereby the selected data sources can be used collectively to provide information requested by the at least one smart contract.

22. The computer-readable storage medium of claim 21, wherein the method further comprises:

logging an event corresponding to a request for information requested by the at least one smart contract;

receiving, by an on-chain aggregating contract, response information from the selected data sources as a response to the event, wherein the on-chain aggregating contract is stored on the same decentralized architecture as the smart contract;

aggregating, by the on-chain aggregating contract, the response information; and determining, by the on-chain aggregating contract, an aggregated answer and providing the aggregated answer to the at least one smart contract as a response to the request from the at least one smart contract.

23. The computer-readable storage medium of claim 21, wherein the required attributes include reputation attributes and further comprising collecting, by an on-chain reputation contract, performance metrics of external data sources and wherein the selecting is accomplished based on matching the performance metrics to the reputation attributes, wherein the on-chain reputation contract is stored on the same decentralized architecture as the smart contract.

24. The computer-readable storage medium of claim 23, wherein the required attributes also include at least one of query parameters, and a number of required external data sources.

25. The computer-readable storage medium of claim 23, wherein the receiving response information from the selected data sources comprises receiving the response information from a decentralized network of off-chain oracle nodes which independently harvest responses from a corresponding set of external data sources through an external API.

26. The computer-readable storage medium of claim 25, wherein receiving the response information from a network of off-chain oracle nodes comprises receiving cryptographic commitments from the oracle nodes and subsequently receiving the response information from the oracle nodes.

27. The computer-readable storage medium of claim 25, wherein the method further comprises determining an aggregated answer through a consensus protocol applied to the oracle nodes and providing the aggregated answer to the at least one smart contract as a response to the request from the at least one smart contract.

28. The computer-readable storage medium of claim 27, wherein the consensus protocol is based on threshold signatures.

29. The computer-readable storage medium of claim 25, wherein the method further comprises monitoring the oracle nodes availability and correctness and validating the oracle nodes based on availability and correctness information.

30. The computer-readable storage medium of claim 23, wherein the reputation attributes include at least one of a total number of assigned requests to an oracle node that the oracle node has agreed to, a total number of requests that an oracle node has fulfilled, total number responses by an oracle node that have been deemed acceptable by requesting smart contracts, and/or an average time it takes for the oracle node to respond to requests.

* * * * *